United States Patent [19]

Kittaka et al.

[11] Patent Number: 4,849,150
[45] Date of Patent: Jul. 18, 1989

[54] METHOD OF MANUFACTURING FIBER-REINFORCED RESIN PIPE

[75] Inventors: Hirokazu Kittaka; Akihiko Nishizaki; Toshihiro Ichijo, all of Sagamihara, Japan

[73] Assignee: Nitto Boseki Co., Ltd, Fukushima, Japan

[21] Appl. No.: 142,918

[22] Filed: Jan. 12, 1988

[30] Foreign Application Priority Data

Jan. 13, 1987 [JP] Japan .................... 62-4013

[51] Int. Cl.⁴ ..................... B29C 45/14; B29C 63/06
[52] U.S. Cl. ........................ 264/258; 156/171
[58] Field of Search ............ 264/241, 258, 257, 264/273; 156/171, 172, 173, 175, 161, 162, 184, 187, 195, 446, 74

[56] References Cited

U.S. PATENT DOCUMENTS

| | | | |
|---|---|---|---|
| 1,504,547 | 8/1924 | Egerton | 264/258 |
| 2,572,924 | 10/1951 | Gonda | 264/258 |
| 2,723,426 | 11/1955 | Pelley | 425/390 |
| 2,785,442 | 3/1957 | Boggs | 264/258 |
| 2,862,541 | 12/1958 | Brink | 264/258 |
| 3,574,104 | 4/1971 | Medler | 264/258 |
| 3,891,489 | 6/1975 | Bordner | 156/171 |
| 3,902,944 | 9/1975 | Ashton et al. | 156/156 |
| 4,256,523 | 3/1981 | Ekstrom | 264/258 |
| 4,283,462 | 8/1981 | Meyer | 264/258 |
| 4,325,766 | 4/1982 | Michael | 156/171 |
| 4,532,169 | 7/1985 | Carley | 264/258 |
| 4,591,155 | 5/1986 | Adachi | 264/258 |
| 4,673,541 | 6/1987 | Watanabe | 264/134 |

*Primary Examiner*—James Lowe
*Assistant Examiner*—Jeremiah F. Durkin, II
*Attorney, Agent, or Firm*—Bert Lewen; Henry Sternberg

[57] ABSTRACT

A method of manufacturing a fiber-reinforced resin pipe which including the steps of forming a plurality of layers by alternately winding a cloth-like material and a continuous fiber on a core. Placing the core in a split type outer mold having an inner surface which forms a desired outer surface of the pipe. Injecting a liquid synthetic resin between the outer mold and the core so that the liquid resin is integrated with the layers and cured into a molded product. Removing the molded product from the outer mold after the resin has cured and removing the core form the molded product.

11 Claims, 2 Drawing Sheets

METHOD OF MANUFACTURING FIBER-REINFORCED RESIN PIPE

BACKGROUND OF THE INVENTION

The present invention relates to a method of manufacturing a fiber-reinforced resin pipe, and, more particularly, to a method of manufacturing a tubular body by a resin injection process (RI process) used in effecting fiber-reinforced plastic molding.

Conventionally, manufacture of a tubular body by the RI process comprises the steps of: winding a sheet-like reinforcing fiber such as a mat or a roving cloth of a fiber glass or a carbon fiber on a core; placing the reinforced fiber wound on the core within an outer mold; and injecting and curing a resin in the outer mold.

Manufacture of a fiber-reinforced resin tubular body is also possible by using a dry-filament-winding process, and this method comprises the steps of: winding a continuous fiber on a core; placing the continuous fiber wound on the core within an outer mold; and injecting and curing a resin in the outer mold.

However, the former method has such disadvantages that a density of fiber contained in a molded product cannot be increased although a resin-impregnating ability becomes good because of a loose structure of the sheet-like fiber and that the provision of a molded product of an increased strength is impossible.

On the other hand, the latter method makes it possible to wind the fiber at a high density by the filament winding process, so that the density of the reinforcing fiber contained in a resultant product becomes high. However, the resin-impregnating ability of the fiber becomes remarkably degraded, with the result that some portions which are not impregnated with resin are apt to remain even when the pressure of the injection of the resin is increased. Reduction in the winding tension for the fiber is apt to cause a disarray of the fiber when the resin is injected under high pressure.

A wet winding process is also known in which a continuous fiber having been impregnated with a resin is wound on a core and is then cured so as to form a resin pipe. This process, however, suffers from the disadvantage that a molded product has a bad appearance due to the non-use of an outer mold.

SUMMARY OF THE INVENTION

The object of the present invention is to overcome the problems of the prior art, and to provide a method of manufacturing a fiber-reinforced resin pipe which enables a fiber to be densely wound on a core by the use of a dry-filament-winding process, which method enables an injected resin to be surely penetrated into the fiber, and which method allows a resultant fiber-reinforced resin pipe to have a beautiful appearance.

The present inventors have found through an intense study that provision of a cloth-like material between fiber layers can improve the resin-impregnating ability of the fiber, and thereby attained the present invention. More specifically, the present invention provides a method of manufacturing a fiber-reinforced resin pipe, comprising the steps of: forming a plurality of layers by alternately winding a cloth-like material and a continuous fiber on a core, placing the core with the layers formed thereon within a split type outer mold having an inner surface which forms a desired outer surface of the pipe; injecting a liquid synthetic resin between the outer mold and the core so that the stacked layers and the resin are integrated by the curing of the resin to thereby obtain a molded product; removing the molded product from the outer mold; and removing the core from the molded product.

Any type of cloth-like material can be used in the present invention. Suitable cloth-like materials include a cloth, a non-woven cloth and a net. In particular, a thin loose cloth such as Victoria lawn is suitable, which loose cloth has a thickness of 0.1 to 0.5 mm and a yarn density of 20 to 100 g/cm$^2$. More preferably, there may be used a loose cloth having a thickness of 0.1 to 0.3 mm and a yarn density of 20 to 50 g/cm$^2$. A single broad sheet may be used as the cloth-like material so as to provide one layer. However, if a tape of cloth is employed, winding is facilitated.

A normal filament-winding machine can be used to wind the continuous fiber and the cloth-like material on the core with a winding tension of 200 to 1000 gf/one roving [gram force/roving]. At this time, if the cloth-like material is in a form of a tape, the continuous fiber and the cloth tape can be alternately and automatically wound on the core, increasing the efficiency of winding the cloth-like material.

Any type of continuous fiber that can be used with a reinforcing resin can be employed in the present invention. Suitable continuous fibers are a glass roving and a carbon roving. No limitation exists with respect to the rovings. Suitable resins include a thermosetting resin and a thermoplastic resin.

In the present invention, since both the continuous fiber layers and the cloth-like material layers are alternately formed on the core, which is then disposed within the outer mold, the injected resin can be caused to flow with an injection pressure of 1 to 2 kgf/cm$^2$ [kg force/cm$^2$] through the cloth-like material layers having a high resin-impregnating ability and is penetrated into the continuous fiber layers, enabling a resin pipe having a high reinforcing-fiber density and hence enabling a high strength pipe to be manufactured. The cloth-like material layers are also effective in preventing the disarray of the continuous fiber layers from being caused by the injected resin. In particular, if they are disposed on the uppermost and lowermost parts of a stacked layer body (in such manner that they make contact with the core and the outer mold, respectively), disarray of the continuous fiber layers can be more effectively prevented. As a result, the winding tension of the fiber can be lowered and the resin can be more readily penetrated so as to provide an excellent molded product in which the fiber layers are disposed in order.

DESCRIPTION OF THE PREFERRED EMBODIMENTS

Embodiments of the present invention will be described hereinunder with reference to the accompanying drawings.

Figure 1A:
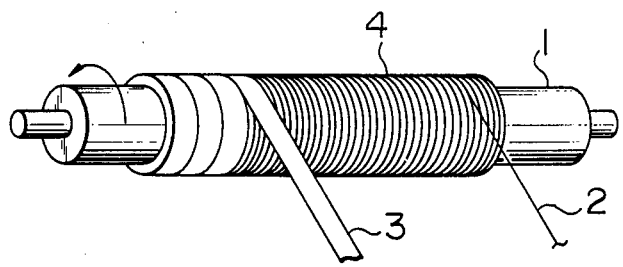
FIG. 1A is a perspective view of a mandrel wound with a continuous fiber and a Victoria lawn tape, showing a first embodiment of the present invention.
Figure 1B:
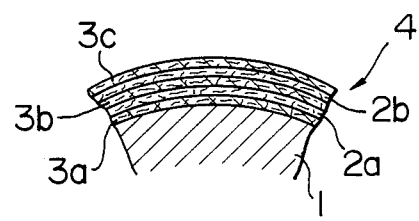
FIG. 1B is a cross-sectional view of the mandrel of FIG. 1A, showing parts of the layers wound on the periphery of the mandrel 1.

Referring first to FIG. 1A, a tape 3 of Victoria lawn is wound with a stress of about 500 gf per one roving and having a width of 100 mm so that no gap exists between two adjacently wound tapes. Then, a continuous fiber 2 of glass roving etc. is wound in a winding angle of 30° with a winding stress of 300 gf per one roving. These windings are effected alternately to provide a stacked wound multi layer body 4. The multi layer body 4 may consist, for example, of a Victoria lawn layer 3a, a continuous fiber layer 2a, a Victoria lawn layer 3b, a continuous fiber layer 2b, and a Victoria lawn layer 3c all of which are laid on the mandrel in this order with the Victoria lawn layer 3a being located on the surface of the mandrel, as shown in FIG. 1B.

Figure 1C:
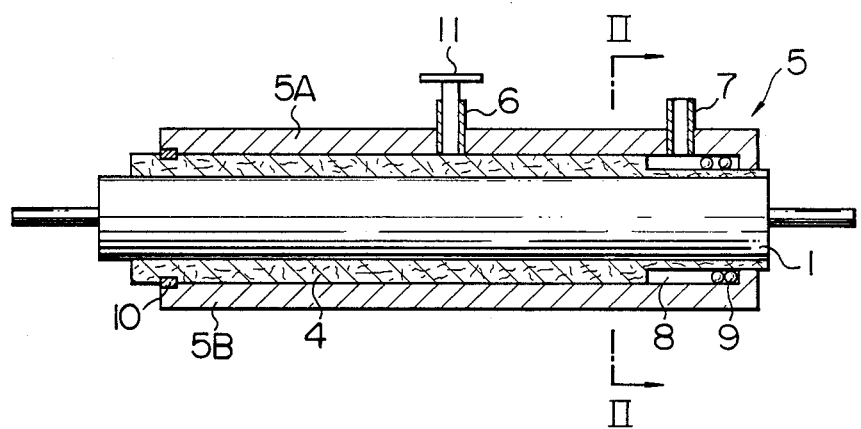
FIG. 1C is a cross-sectional view showing the mandrel and the layers wound around the mandrel which are placed inside an outer mold.
Figure 2:
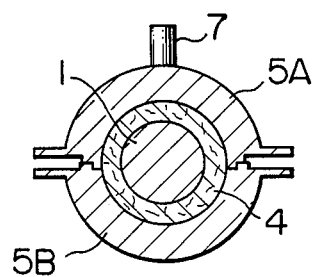
FIG. 2 is a cross-section taken along the line of II—II of FIG. 1C.
Figure 3:
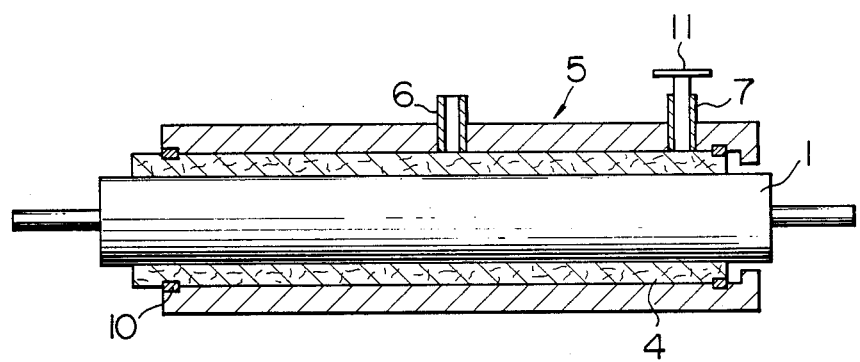
FIG. 3 is a view similar to FIG. 1C, showing another embodiment of the present invention.

Subsequently, the mandrel 1 with the multi layer body 4 formed thereon is placed within an outer mold 5, as shown in FIG. 1C. The outer mold 5 comprises split molds which are an upper mold 5A and a lower mold 5B, as shown in FIG. 2. The upper mold 5A is provided with a central inlet 6 and an end inlet 7, as shown in FIG. 1C. The right end of the multi layer 4 as viewed in FIG. 1C is made thinner so as to provide a resin-injecting space 8 within the outer mold 5. In the vicinity of the right and left ends of the outer molds 5A, 5B there are provided O-rings 9 and a ring 10 for preventing resin from leaking outwardly, respectively. A liquid resin is then injected under pressure from the end injection inlet 7 into the outer mold 5. The central injection inlet 6 is plugged by a plug 11, so that the injected resin is penetrated into the multi-layer body 4 disposed between the mandrel 1 constituting a core and the outer mold 5 and is integrated with the multi layer body 4. Since the Victoria lawn layers have characteristics that they are readily impregnated with the liquid resin, the resin permeates into the entirety of the Victoria lawn layers and then permeates in the adjacent continuous fiber layers, so that the entirety of the multi layer body 4 is uniformly impregnated with the resin. After the liquid resin is thermally cured or naturally cured, a resulting molded product is removed from the outer mold 5, and the mandrel 1 is then removed from the molded product. Thus, a fiber-reinforced resin pipe is manufactured which has a high density of reinforcing fiber, in which a resin is uniformly penetrated over the entirety of the molded product, and which has a beautiful surface.

In the embodiment described above, the liquid resin is injected into the outer mold from the end injection inlet 7. This method is suitable for manufacturing a fiber-reinforced resin pipe having a large thickness (that is, an increased number of layers). To manufacture a pipe having a smaller thickness, the end injection inlet 7 may be plugged by the plug 11, and the liquid resin may be forced into the outer mold 5 from the central injection inlet 6.

The above-described embodiment employs a mandrel 1 having a circular cross-section so as to manufacture a cylindrical pipe. Manufacture of a pipe having a triangular to square cross-section is also possible if a mandrel 1 and an outer mold 5 having a triangular or square form are used.

The above-described embodiment involves manufacture of a pipe as a single unit. However, the present invention is not limited to the manufacture of such a pipe and can be applied to a manufacture of a pipe and another member which are formed as one unit. Conventionally, a large-sized container of a fiber-reinforced plastic is manufacture by separately molding an outer plate and a cylindrical reinforcing frame and by joining them by a hand lay-up method. However, if the present invention is adopted in molding the reinforcing frame, the outer plate and the reinforcing frame may be molded by the resin injection method as one unit, increasing the molding efficiency and the combination strength.

The present invention will be described below by way of example;

Example I

A resin pipe was manufactured from the materials described below by the method shown in FIGS. 1A to 1C under the conditions described below.

Materials:

Glass roving means made of four rovings each having a size of 2400 Tex (g/1 km), which roving is wound at a density of 800 g per one meter of a mandrel; Victoria lawn having a thickness of 0.18 to 0.2 mm, a width of 100 mm and a density of 26 g/m$^2$; and polyester resin.

Structure of multi-layers:

A Victoria lawn layer + a glass roving layer + a Victoria lawn layer + a glass roving layer + a Victoria lawn layer Form of product:

A cylinder having an inner diameter of 100 mm, an outer diameter of 106 mm, and a length of 1200 mm.

The fiber content and the stiffness modulus of the resultant resin pipe were measured, the results shown in Table 1 being obtained. In stiffness testing, the cylindrical molded product was supported at a span of 1000 mm, a load was applied to the center of the product, and the deflection thereof was measured to plot a stress-strain curve.

Example II

A resin pipe was manufactured from the materials described below under the conditions described below by the method shown in FIGS. 1A to 1C. The fiber content and the stiffness modulus of the product were measured in the similar manner as in Example I, and the results shown in Table 1 were obtained.

Materials:

Carbon roving means made of four carbon rovings, each having a size of 800 Tex, which roving is wound at a density of 350 g/m; Victoria lawn having the same conditions as in Example I; and polyether resin. p Structure of multi-layer:

A Victoria lawn layer + a carbon roving layer + a Victoria lawn layer + a carbon roving layer + a Victoria lawn layer + a carbon roving layer + a Victoria lawn layer Form of product:

The same as that in Example I

Comparison Example I

A glass roving was impregnated with a liquid polyester resin, and the glass roving was wound around a mandrel and cured so as to make a molded product having the same form as that of the product manufactured in Example I (the wet winding method). The same measurements as those in Example I were conducted on the thus-obtained product. Table 1 shows the results of the measurements.

Comparison Example II

A carbon roving was impregnated with a liquid polyester resin, and that carbon roving was wound around a mandrel and cured so as to make a molded product having the same configuration as that of the product manufactured in Example I (the wet winding method). The same measurements as those in Example I were conducted on the thus-obtained product, and the results shown in Table 1 were obtained.

Comparison Example III

A molded product having the same form as that of the product obtained in Example I was manufactured by the resin injection method using a preformed mat of a fiber glass. The same measurements as those in Example I were conducted on the molded product, and the results shown in Table 1 were obtained.

TABLE 1

|  | Fiber Content | Stiffness Modulus |
| --- | --- | --- |
| Example I | 74 wt % | 3200 kg/mm$^2$ |
| Example II | 68 | 4800 |
| Comparison Example I | 75 | 3400 |
| Comparison Example II | 70 | 4900 |
| Comparison Example III | 30 | 800 |

As can be seen from Table 1, the products obtained by the resin injection method in Examples I and II exhibited a fiber content and a stiffness modulus which were remarkably larger than those of the product made by using the preformed mat (in Comparison Example III), and had the similar properties to those of the products made by the wet winding method (in Comparison Examples I and II). Moreover, they had an appearance which was far more beautiful than that of the products obtained by the wet winding method (in Comparison Examples I and II).

As will be understood from the foregoing description, the present invention has the following advantages:

(1) Provision of a cloth-like material between layers of a continuous-fiber layer improves the fluidity of the resin, thereby making it possible to decrease resin-injecting pressure in comparison with the conventional method.

(2) Since the disarray of the continuous fiber in the multi layers that had occurred in a conventional method when the resin is injected can be prevented by the provision of the cloth-like material, winding tension of the fiber can be kept lowered, further facilitating penetration of the resin. At the same time, the tolerance of the winding tension for the continuous fiber is increased, and the control of tension is made easy.

(3) The fiber content can be increased as a result of improvement in the resin impregnating ability, increasing the strength remarkably (to the same degree as that of the molded products made by the known wet winding method).

(4) Because of the use of the outer mold, the molded product has a beautiful appearance in comparison with those made by the wet winding method.

(5) If the present invention is adopted in molding a reinforcing frame of a large-sized container made of a fiber-reinforced plastic, the outer plate and the reinforcing frame can be molded as one unit by the resin injection method, increasing the molding efficiency and combination strength.

What is claimed is:

1. A method of manufacturing a fiber-reinforced resin pipe comprising the steps of:
    forming a plurality of layers by alternately winding a readily impregnated thin loose cloth-like material, in the form of a loose cloth having a thickness of 0.1 to 0.5 mm and a density of 20 to 100 g/m$^2$, and a continuous fiber on a core;
    placing said core with said layers formed thereon within a split type outer mold having an inner surface which forms a desired outer surface of said pipe;
    injecting a liquid synthetic resin at a pressure in a range of 1 to 2 Kg force/cm$^2$ between said outer mold and said core so that said liquid resin is integrated with said layers and cured into a molded product; and then
    removing said molded product from said outer mold and removing said core from said molded product.

2. A method as set forth in claim 1, wherein the cloth-like material is a loose cloth having a thickness of 0.1 to 3.0 mm and a density of 20 to 50 g/m$^2$.

3. A method as set forth in claim 1, wherein the continuous fiber is wound on the core with a winding tension of 200 to 1000 gf per one roving.

4. A method as set forth in claim 1, wherein the continuous fiber is one selected from the group consisting of glass roving and carbon roving.

5. A method as set forth in claim 1, wherein the resin is one selected from the group consisting of thermosetting resins.

6. A method as set forth in claim 1, wherein a thickness of the layers wound on the core is reduced at one end thereof so that a space for injecting the resin is provided between the outer surface of the layers and the outer mold, the resin being injected through the space.

7. A method as set forth in claim 1, wherein the resin is injected between the outer mold and the core through an opening provided at the center of the outer mold.

8. Method of claim 1 wherein the continuous fiber is wound at a winding angle of about 30 degrees.

9. Method of claim 1 wherein the uppermost and lowermost layers formed on the core are of the cloth-like material.

10. Method of manufacturing a fiber-reinforced resin pipe comprising the steps of:
    forming a plurality of layers by alternately winding a readily impregnated thin loose cloth-like material, in the form of a loose cloth having a thickness of 0.1 to 0.5 mm and a density of 20 to 100 g/m$^2$, and a continuous fiber on a core, the continuous fiber being wound on the core at a winding angle of about 30 degrees, with a winding tension of 200 to 1000 gram force per one roving;
    placing said core with said layers formed thereon within a split type outer mold having an inner surface which forms a desired outer surface of said pipe;
    injecting a liquid synthetic resin at a pressure in a range of 1 to 2 Kg force/cm$^2$ between said outer mold and said core so that said liquid resin is integrated with said layers and cured into a molded product; and then
    removing said molded product from said outer mold and removing said core from said molded product.

11. Method of claim 10 wherein the uppermost and lowermost layers formed on the core are of the cloth-like material.

* * * * *